2,879,285

DIALKYL AND DI (HALOALKYL) α-MERCAPTOPHOSPHONATE ESTERS AND PROCESS FOR THEIR PREPARATION

Gail H. Birum, Dayton, Ohio, assignor to Monsanto Chemical Company, St. Louis, Mo., a corporation of Delaware No Drawing. Application December 30, 1955
Serial No. 556,436

17 Claims. (Cl. 260—461)

This invention relates to α-mercaptophosphonate esters and to a method of preparing the same.

It is an object of the present invention to provide a method for the synthesis of chemical intermediates. It is a further object of the present invention to provide α-mercaptophosphonates. It is a further object of the present invention to provide a process for the synthesis of mercaptophosphonate compounds. Another object of the present invention is to provide new catalysts for the synthesis of mercapto compounds from carbonyl compounds.

It has been known in the prior art to prepare α-hydroxy-phosphonic acid compounds by the reaction of an aldehyde or ketone with a phosphorus compound such as hypophosphorous acid, phosphorus trichloride or a dialkyl phosphite. No method has been known hitherto, however, to prepare the analogous α-mercaptophosphonic compounds.

It has now been found that mercaptophosphonic acid compounds may be readily prepared by the reaction of hydrogen sulfide with a ketophosphonic acid ester in the presence of hydrogen. This reaction may be illustrated, e.g., by the following equation, showing the conversion of an α-ketophosphonate to an α-mercaptophosphonate.

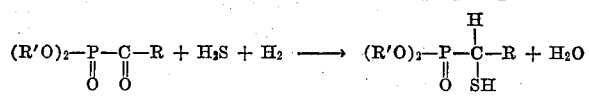

where R is the residue of an organic carboxylic acid containing up to eighteen carbon atoms and R' is a radical containing from one to twelve carbon atoms and selected from the class consisting of hydrocarbon radicals and halogen-substituted hydrocarbon radicals.

The α-ketophosphonic acid esters are readily available, e.g., by the reaction of an acid halide with a phosphite ester, as described by Kabachnik et al. (Bull. Acad. Sci. USSR, Classe Sci. Chim. 1945, 364–74, 408; Chem. Abstracts 40, 4688). Ketophosphonic esters wherein the keto group is β-, γ-, or further removed from the phosphorus atom may be prepared, e.g., by the reaction of an organic keto halide with a tertiary phosphite ester.

Particularly preferred in the present process are α-ketophosphonic acid compounds of the above formula where R' is an alkyl or haloalkyl radical and R is a radical containing no elements other than carbon and hydrogen. The ester radicals in the present esters, represented by R' above, may be the same or different; also useful are cyclic phosphonate esters, wherein the two R' groups taken together represent an alkylene chain or phenylene radical.

As examples of the presently useful dialkyl phosphonate esters of the above formula wherein R is the residue of an aliphatic monocarboxylic acid may be listed, e.g., diethyl acetylphosphonate, dimethyl acetylphosphonate, ethyl methyl acetylphosphonate, bis(2-chloroethyl) acetylphosphonate, the ethylene glycol cyclic ester of acetylphosphonic acid, diethyl propionylphosphonate, diethyl butyrylphosphonate, diethyl isobutyrylphosphonate, bis(2-chloroethyl) isovalerylphosphonate, diethyl 2-ethylhexanoylphosphonate, diethyl pivalylphosphonate, ethyl 2-ethylhexyl 2-ethylhexanoylphosphonate, diethyl lauroylphosphonate, diethyl caproylphosphonate, diethyl enanthylphosphonate, diethyl formylphosphonate, diethyl palmitoylphosphonate, diisopropyl stearoylphosphonate, diisopropyl pelargonylphosphonate, di-n-butyl acetylphosphonate, diamyl acetylphosphonate, bis(2-ethylhexyl) acetylphosphonate, bis(2-bromopropyl) acetylphosphonate, dinonyl acetylphosphonate, didodecyl propionylphosphonate, etc.

Presently useful alkyl and haloalkyl esters derived from acids containing an aromatic or aliphatic carbocyclic radical, are for example: diethyl benzoylphosphonate, bis(2-chloroethyl) benzoylphosphonate, diethyl 1-naphthoylphosphonate, diethyl p-toluylphosphonate, diisobutyl cumoylphosphonate, diethyl phenylacetylphosphonate, bis(2-bromoethyl) phenylacetylphosphonate, di-n-propyl 4-phenylbutyrylphosphonate, diisobutyl cyclohexanecarbonylphosphonate, etc. Also useful in the present process are the α-ketophosphonates of the above formula wherein R' is a cycloalkyl, aryl, alkaryl, or aralkyl radical, such as diphenyl isovalerylphosphonate, diphenyl benzoylphosphonate, dibenzyl benzoylphosphonate, di-p-tolyl acetylphosphonate, phenyl p-tolyl benzoylphosphonate, bis(2-cyclohexylethyl) acetylphosphonate, etc., as well as ketophosphonates wherein the two R' radicals taken together represent a bivalent hydrocarbon radical, such as propylene acetylphosphonate, o-phenylene benzoylphosphonate, etc.

Aliphatic, carbon-to-carbon unsaturation may also be present in the phosphonic acid compounds useful in the present reaction, although, as explained hereinbelow, certain additional reactions may then occur during the present process of conversion of an α-keto to an α-mercapto group. As examples of phosphonates of the above formula wherein one of the substituent ester radicals is unsaturated may be listed, e.g., diallyl acetylphosphonate, diallyl enanthylphosphonate, diallyl benzoylphosphonate, dimethallyl acetylphosphonate, dimethallyl butyrylphosphonate, dimethallyl phenylacetylphosphonate, etc. Exemplary phosphonates containing an unsaturation in the organic radical attached directly to the phosphorus atom through a carbonyl carbon atom are diethyl acrylylphosphonate, diethyl methacrylylphosphonate, diethyl cinnamoylphosphonate, diethyl propiolylphosphonate, bis(2-chloroethyl) acrylylphosphonate, etc.

Also contemplated by the present invention are the phosphonates of the above formula wherein the substituent designated R carries functional groups which do not interfere in the present reaction. Examples of such groups are halogen, alkoxy, carboxyl, carbalkoxy, etc. Examples of esters of α-ketophosphonic acid compounds wherein a non-interfering substituent is present on the organic radical attached to the phosphorus atom through a carbonyl carbon atom are, e.g., halogen-substituted acylphosphonates such as diethyl chloroacetylphosphonate, diethyl trichloroacetylphosphonate, diisopropyl chloroacetylphosphonate, bis(2-ethylhexyl) chloroacetylphosphonate, di-n-propyl trichloroacetylphosphonate, di-sec-butyl trichloroacetylphosphonate, diethyl fluoroacetylphosphonate, diethyl 2-bromobutyrylphosphonate, bis(2-chloroethyl) β-chloropropionylphosphonate, diallyl chloroacetylphosphonate, diethyl 18-fluorooctadecanoylphosphonate, diethyl 2-bromotetradecanoylphosphonate, diethyl p-chlorobenzoylphosphonate, dibenzyl p-chlorobenzoylphosphonate, diethyl p-bromobenzoylphosphonate, diethyl 2,4-dichlorobenzoylphosphonate, dimethyl 2,4,5-trichlorobenzoylphosphonate, diethyl 2-chloro-4-bromobenzoylphosphonate, diisopropyl p-chlorophenylacetylphosphonate, etc. Examples of alkoxy-substituted presently useful phosphonates are, e.g., diethyl methoxyacetylphosphonate, dibutyl butoxyacetylphosphonate, diethyl 2-phenoxyacetylphosphonate, bis(2-chloroethyl) anisoylphosphonate, diethyl p-ethoxybenzoylphosphonate, etc. Examples of presently useful carboxy substituted and carbalkoxy substituted phosphonates are, e.g., ethyl 3-(diethoxyphosphinyl)-3-oxopropionate, ethyl o-(diethoxyphosphinyl)carbonylbenzoate, etc. It is to be understood that other functional groups may be present in the phosphonates used in the present process if desired, the only limitation being that groups such as keto substituents may undergo reaction in the present process and be converted to thiol groups in addition to the desired reduction of the carbonyl carbon atom adjacent to the phosphorus atom.

The products of the present process are α-mercaptophosphonate esters. As examples of α-mercaptophosphonates derived from the reaction of the presently preferred dialkyl and di-haloalkyl α-ketophosphonate esters with hydrogen sulfide and hydrogen in accordance with the present process may be listed, e.g., diethyl mercaptomethylphosphonate, diethyl 1-mercaptoethylphosphonate, dimethyl 1-mercaptoethylphosphonate, diisopropyl mercaptomethylphosphonate, bis(2-chloroethyl) 1-mercaptoethylphosphonate, diamyl 1-mercaptoethylphosphonate, bis(2-ethylhexyl) 1-mercaptoethylphosphonate, didecyl 1-mercaptoethylphosphonate, didodecyl 1-mercaptoethylphosphonate, diethyl 1-mercaptopropylphosphonate, diisobutyl 1-mercaptopropylphosphonate, di-n-butyl 1-mercaptopropylphosphonate, dinonyl 1-mercaptobutylphosphonate, diethyl 1-mercaptobutylphosphonate, bis(2-bromobutyl) 1-mercaptobutylphosphonate, dihexyl 1-mercaptopentylphosphonate, diethyl 1-mercapto-2-ethylheptanylphosphonate, dimethyl 1-mercaptododecylphosphonate, diethyl 1-mercaptooctadecylphosphonate, diethyl α-mercaptobenzylphosphonate, diisopropyl α-mercaptobenzylphosphonate, diamyl α-mercaptobenzylphosphonate, bis(2-chloroethyl) 1-mercaptobenzylphosphonate, dimethyl α-mercapto-p-propylbenzylphosphonate, diethyl α-mercapto-p-t-butylbenzylphosphonate, diethyl α-mercapto-p-methylbenzylphosphonate, diethyl 2-phenyl-1-mercaptoethylphosphonate, diethyl cyclohexylmercaptomethylphosphonate, etc. Examples of the presently produced novel α-mercaptophosphonates derived from α-ketophosphonates containing non-interfering substituents on the radical designated as R in the above formula are e.g., diethyl 2,2,2-trichloro-1-mercaptoethylphosphonate, dibutyl 2,2,2-trichloro-1-mercaptoethylphosphonate, bis(2-chloroethyl) 2-chloro-1-mercaptoethylphosphonate, diethyl 2-chloro-1-mercaptoethylphosphonate, diethyl 2-fluoro-1-mercaptoethylphosphonate, diethyl p-chloro-α-mercaptobenzylphosphonate, dibutyl p-chloro-α-mercaptobenzylphosphonate, diethyl p-methoxy-α-mercaptobenzylphosphonate, etc. As explained hereinabove, also useful in the present process are phosphonates wherein the ester or acyl radicals attached to the phosphorus atom contain olefinic or acetylenic unsaturation; under the reaction conditions, hydrogen sulfide may add to the olefinic bond as well as reacting with the carbonyl group to replace that group by a thiol radical, so that dithiols are obtained. As examples of dithiols which may be obtained in accordance with the present process may be listed, e.g., bis-(3-mercaptopropyl) 1-mercaptoethylphosphonate, bis(3-mercaptopropyl) α-mercaptobenzylphosphonate, bis(3-mercapto-1-methylpropyl) 1-mercaptoethylphosphonate, etc.

In carrying out the present process, the α-ketophosphonate ester is contacted with hydrogen sulfide and hydrogen in the presence of a catalyst. In general, the present process is preferably carried out under pressure, which may be, for example, a pressure of from 10 atmospheres up to a 1000 atmospheres. Preferably temperatures of around 50° C. to 200° C. are applied to accelerate the reaction; ambient room temperatures may alternatively be employed, but the reaction proceeds relatively slowly under such conditions. Instead of hydrogen sulfide, substances which yield hydrogen sulfide under the reaction conditions may be substituted. For example, sulfur is rapidly converted by hydrogen into hydrogen sulfide under the present reaction conditions, and thus, sulfur may be substituted for hydrogen sulfide in the present process. Similarly, carbon disulfide may be substituted for the hydrogen sulfide.

The reaction, as illustrated by the above equation, is essentially a reaction between one mole of hydrogen sulfide, one mole of hydrogen and one mole of the phosphonate compound. Thus, theoretically, the reaction may be carried out by charging equimolecular amounts of these substances into the reaction vessel. Usually, however, it is preferable to charge the reaction vessel with an excess of hydrogen, and also to use an excess of the sulfur-containing reactant over that theoretically required. Generally, two molar proportions of the sulfur-containing compound per mole of phosphonate or a greater excess may be used.

A hydrogenation catalyst is utilized to facilitate the reaction of this invention. Catalysts for the present process are hydrogenation catalysts which are resistant to sulfur poisoning. Such catalysts are well known in the chemical art. Examples of metals active as hydrogenation catalysts in the presence of sulfur compounds under the present reaction conditions are, e.g., silver, copper, molybdenum, manganese, lead, iron, nickel, and, which is particularly preferred, cobalt. The catalyst compositions used in carrying out the present invention may comprise, e.g., a finely divided form of one of the catalytic metals listed above, contacted with the reaction mixture, for example, as a suspension or paste in a liquid carrier, or deposited on a solid catalyst support. Sulfides of these catalytic metals are also active hydrogenation catalysts in the presence of sulfur compounds, and may be used in the present process if desired. Furthermore, I have also made the discovery that the conversion of carbonyl compounds to mercapto compounds may be catalyzed by carboxylic acid salts of the above metals.

So far as I am aware, the use of carboxylic acid salts of sulfur-resistant hydrogenation catalyst metals for the conversion of carbonyl compounds to mercapto compounds has not been described previously, and the use of the carboxylate salts of these metals as catalysts for the conversion of oxo carbonyl compounds, i.e., aldehyde and ketone compounds, to mercapto compounds, forms one novel aspect of this invention. Carboxylic acid salts possess many advantages over the catalysts proposed hitherto, in that they are readily prepared, and may be conveniently handled, e.g., in organic solvent solutions or suspensions. Excellent yields, moreover, have been obtained in the present process with these salts. An examples of presently useful catalytic salts may be listed, e.g., cobalt acetate, cobalt propionate, cobalt isovalerate, cobalt pelargonate, cobalt 2-ethylhexoate, cobalt benzoate, cobalt p-toluate, cobalt phthalate, cobalt phenylacetate, nickel acetate, nickel 2-ethylhexoate, ferrous acetate, molybdenum pelargonate, etc. Examples of suitable solvents or diluents wherein these salts may be conveniently handled for contacting them with reaction mixtures containing carbonyl compounds are, e.g., xylene, hexane, kerosene, dioxane, etc. The amount of catalyst used is not critical. Thus, for example, from one-tenth or less to 5 percent or more of the weight of the phosphonate may represent the catalyst proportion in the reaction mixture. If desired, a promoter, such as an acidic compound, e.g., acetic acid, may be added to the reaction mixture, but I have found that the conversion of the present carbonyl compounds to mercapto compounds proceeds readily in the absence of such promoters.

The process may be carried out in the presence or absence of solvents or diluents. Examples of suitable solvents are, e.g., hydrocarbon solvents such as benzene, toluene, xylene, hexane, etc.; oxygen-containing compounds such as ethers, e.g., dioxane, dibutyl ether, etc.

With suitable modifications of apparatus and procedure, the batch operation of the process described below is interchangeable with continuous procedures.

The invention is further illustrated, but not limited, by the following examples:

Example 1

This example describes the conversion of dimethyl acetylphosphonate to dimethyl 1-mercaptoethylphosphonate.

Dimethyl acetylphosphonate was prepared by the reaction of trimethyl phosphite with acetyl chloride at below room temperature. A 300 cc. rocking autoclave containing 83.2 grams (0.55 mole) of dimethyl acetylphosphonate, 50 ml. of liquid hydrogen sulfide, 5 ml. of glacial acetic acid and 10 g. of a xylene solution of cobalt 2-ethylhexoate (about 1 g. as cobalt) was pressured to 1800 p.s.i. with hydrogen. The bomb was then heated to 115° C. (2400 p.s.i.), at which point absorption of hydrogen began to occur, as shown by a pressure drop. The temperature in the reactor was maintained at 120–130° C. for about a half hour, after which additional hydrogen was added to raise the pressure to 2500 p.s.i. At the end of another half hour hydrogen was again added, whereupon it was found that no further absorption occurred in the next fifteen minutes. The bomb was vented, the off-gases being absorbed in an alkaline solution, and the reaction mixture removed. Filtration of the reaction mixture gave a green liquid, of which 23.5 g. of a colorless fraction boiling at 65–74° C./0.05 mm. was collected and redistilled. The eight-gram portion of this distillate boiling at 68–69° C./0.03 mm., $n_D^{25}$ 1.4691, gave the following analysis, in good agreement with the calculated analysis for dimethyl 1-mercaptoethylphosphonate:

|  | Calcd. for $C_4H_{11}O_3PS$ | Found |
| --- | --- | --- |
| Percent C | 20.2 | 20.51 |
| Percent H | 6.52 | 7.11 |
| Percent P | 18.2 | 17.70 |
| Percent S | 18.85 | 18.45 |

Example 2

This example describes the preparation of diethyl 1-mercaptoethylphosphonate.

Diethyl acetylphosphonate was prepared from 249 g. (1.5 moles) of freshly distilled triethyl phosphite, added over a period of about one hour to a flask containing 112 g. (1.43 moles) of acetyl chloride, held at below 30° C. After addition of the triethylphosphite was complete, the solution was warmed to about 100°. On removal of unreacted material and by-products, there were obtained 229 g. (89% yield) of diethyl acetylphosphonate, b. 72–73°/1–1.5 mm., $n_D^{25}$ 1.4213.

A reaction mixture containing 90 g. (0.5 mole) of the diethyl acetylphosphonate, prepared as described above, together with 25 grams (0.75 mole) of hydrogen sulfide, 10 grams of a solution of cobalt 2-ethylhexoate in xylene (about 1 g. as cobalt), and hexane and benzene as diluents, was placed in a rocking autoclave. The autoclave was pressured with hydrogen to 1350 p.s.i at below 0° C., after which the temperature was raised gradually over a period of 45 minutes to above 100° C. The reaction mixture was held at this temperature for some 2½ hours, during which absorption of hydrogen occurred. Unreacted hydrogen sulfide was found present when the bomb was opened, after cooling. The reaction mixture was filtered, the colorless distillate boiling at 70–86° C./0.2–0.4 mm. (maximum pot temperature, 132° C.) being isolated for redistillation. Fractionation of this distillate in a 12 mm. Todd column yielded 63.0 grams of diethyl 1-mercaptoethylphosphonate (a 64% yield), colorless liquid, $n_D^{25}$ 1.4584, B.P. 75° C./0.3 mm., analyzing as follows:

|  | Calcd. for $C_6H_{15}O_3PS$ | Found |
| --- | --- | --- |
| Percent C | 36.4 | 36.59 |
| Percent H | 7.63 | 8.06 |
| Percent P | 15.64 | 15.15 |
| Percent S | 16.00 | 16.29 |

Diethyl 1-mercaptoethylphosphonate is an insecticide. For example, there was found to be a 100% mortality of second instar Mexican bean beetle *Epilachna varivestis* larvae placed on plants which had been dipped in 0.2% or 0.1% solutions of this phosphonate and dried.

Example 3

This example describes the preparation of dibutyl α-mercaptobenzylphosphonate.

Employing the procedure of Example 2, but replacing diethyl acetylphosphonate with one-third mole of dibutyl benzoylphosphonate, there were obtained 82.0 g. of dibutyl α-mercaptobenzylphosphonate, b. 168–175° C./0.8 mm. (decompn.), $n_D^{25}$ 1.5033, analyzing as follows:

|  | Calcd. for $C_{15}H_{25}O_3PS$ | Found |
| --- | --- | --- |
| Percent C | 55.64 | 56.9 |
| Percent H | 8.11 | 7.97 |
| Percent S | 8.11 | 10.1 |

Example 4

This example describes the preparation of bis(2-chloroethyl) 1-mercaptononylphosphonate.

A mixture of 81 g. (0.3 mole) of tris(2-chloroethyl) phosphite and 53 g. (0.3 mole) of nonanoyl chloride was refluxed for one hour and then concentrated to a pot temperature of 147° C./0.2 mm. to give 101.0 g. of bis(2-chloroethyl) nonanoylphosphonate. An autoclave charged with 96.9 g. of this bis(2-chloroethyl) nonanoylphosphonate, 5 g. of cobalt sulfide and 45 ml. of hydrogen sulfide was pressured with hydrogen and heated at 145–155° C. for one and a half hours (maximum pressure, 2770 p.s.i.). The reaction mixture foamed considerably when the autoclave was vented after cooling. Filtration and concentration of the autoclave contents to a pot temperature of 102°/0.1 mm. gave bis(2-chloroethyl) 1-mercaptononylphosphonate, green liquid, $n_D^{25}$ 1.4786.

The present α-mercaptophosphonate esters are stable compounds, which generally range from mobile to viscous liquids. They are useful for a wide variety of applications. Thus, for example, the present compounds possess pesticidal properties, e.g., as insecticides and nematocides, and may be used as agricultural chemicals; they may be used as oil additives, e.g., for the prevention of corrosion, or as oxidation inhibitors; they may be used as polymerization modifiers for synthetic rubbers, etc. As chemical intermediates, they are valuable in the production of sulfide and disulfide compounds, in the synthesis of sulfonic acids, etc. Thus, for example, the present compounds may be used for the preparation of (aryldithio)alkylphosphonate esters, which are potent biological toxicants. The preparation of (aryldithio)-alkylphosphonates is described in my copending application, Serial No. 556,438, filed of even date herewith, assigned to the same assignee as the present application.

While the above material is illustrative of the methods and products of the present invention, other procedures and products within the scope of this invention will readily occur to those skilled in the arts and it is intended that this invention shall be limited only as described by the appended claims.

What is claimed is:

1. Compounds of the formula

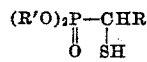

where R is a hydrocarbon radical free of aliphatic unsaturation containing up to 18 carbon atoms and R' is a radical containing from 1 to 12 carbon atoms and selected from the class consisting of alkyl radicals and halogen-substituted alkyl radicals.

2. Dialkyl esters of 1-mercaptoalkylphosphonic acids wherein the said alkyl ester radicals contain from 1 to 12 carbon atoms and wherein the mercaptoalkyl radicals of the said 1-mercaptoalkylphosphonic acids contain from 1 to 18 carbon atoms.

3. Diethyl 1-mercaptoethylphosphonate.

4. Dimethyl 1-mercaptoethylphosphonate.

5. Bis(haloalkyl) esters of 1-mercaptoalkylphosphonic acids wherein the said haloalkyl ester radicals contain from 1 to 12 carbon atoms and wherein the mercaptoalkyl radical of the said 1-mercaptoalkylphosphonic acids contain from 1 to 18 carbon atoms.

6. Bis(2-chloroethyl) 1-mercaptononylphosphate.

7. Dialkyl esters of α-mercaptoaralkylphosphonic acids wherein the said alkyl ester radicals contain from 1 to 12 carbon atoms, and the mercaptoaralkyl radicals of the said α-mercaptoaralkylphosphonic acids contain from 1 to 18 carbon atoms.

8. Dibutyl α-mercaptobenzylphosphonate.

9. The process which comprises contacting an α-ketophosphonate ester of the formula

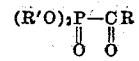

where R is a hydrocarbon radical free of aliphatic unsaturation containing up to 18 carbon atoms and R' is a radical containing from 1 to 12 carbon atoms and selected from the class consisting of alkyl radicals and halogen-substituted alkyl radicals, with hydrogen sulfide and hydrogen in the presence of a hydrogenation catalyst resistant to sulfur poisoning, and isolating from the resulting reaction product an α-mercaptophosphonate compound of the formula

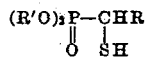

where R and R' are as defined hereinabove.

10. The process which comprises contacting an α-ketophosphonate ester of the formula

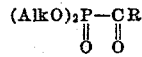

where Alk is an alkyl radical of from 1 to 12 carbon atoms, and R is a hydrocarbon radical free of aliphatic unsaturation containing up to 18 carbon atoms, with hydrogen sulfide and hydrogen in the presence of a hydrogenation catalyst resistant to sulfur poisoning, and isolating from the resulting reaction product a dialkyl ester of a 1-mercaptoalkylphosphonic acid of the formula

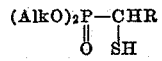

where Alk and R are as hereinabove defined.

11. The process which comprises contacting an α-ketophosphonate ester of the formula

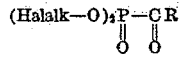

where Halalk is a haloalkyl radical containing from 1 to 12 carbon atoms and R is a hydrocarbon radical free of aliphatic unsaturation containing up to 18 carbon atoms, with hydrogen sulfide and hydrogen in the presence of a hydrogenation catalyst resistant to sulfur poisoning, and isolating from the resulting reaction product a bis(haloalkyl)-ester of a 1-mercaptoalkylphosphonate of the formula

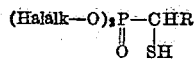

where Halalk and R are as defined hereinabove.

12. The process which comprises contacting a dialkyl α-ketophosphonate ester of the formula

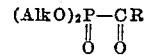

wherein Alk is an alkyl radical of from 1 to 12 carbon atoms, and R is a hydrocarbon radical containing no aliphatic unsaturation at least one benzenoid ring and containing up to 18 carbon atoms, with hydrogen sulfide and hydrogen in the presence of a hydrogenation catalyst resistant to sulfur poisoning, and isolating from the resulting reaction product a dialkyl ester of an α-mercaptoaralkylphosphonate of the formula

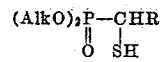

where Alk and R are as defined hereinabove.

13. The process which comprises contacting dimethyl acetylphosphonate with hydrogen sulfide and hydrogen in the presence of a hydrogenation catalyst resistant to sulfur poisoning, and isolating from the resulting reaction product dimethyl 1-mercaptoethylphosphonate.

14. The process which comprises contacting diethyl acetylphosphonate with hydrogen sulfide and hydrogen in the presence of a hydrogenation catalyst resistant to sulfur poisoning, and isolating from the resulting reaction product diethyl 1-mercaptoethylphosphonate.

15. The process which comprises contacting bis(2-chloroethyl)nonanoylphosphonate with hydrogen sulfide and hydrogen in the presence of a hydrogenation catalyst resistant to sulfur poisoning, and isolating from the resulting reaction product bis(2-chloroethyl) 1-mercaptononylphosphonate.

16. The process which comprises contacting dibutyl benzoylphosphonate with hydrogen sulfide and hydrogen in the presence of a hydrogenation catalyst resistant to sulfur poisoning, and isolating from the resulting reaction product dibutyl α-mercaptobenzylphosphonate.

17. The process which comprises contacting an α-ketophosphonate ester of the formula

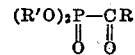

where R is a hydrocarbon radical free of aliphatic unsaturation containing up to 18 carbon atoms and R' is a radical containing from 1 to 12 carbon atoms and selected from the class consisting of alkyl radicals and halogen-substituted alkyl radicals, with hydrogen sulfide and hydrogen in the presence of an organic carboxylic acid salt of a metal which is an active hydrogenation catalyst resistant to sulfur poisoning, and isolating from the resulting reaction product an α-mercaptophosphonate compound of the formula

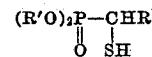

where R and R' are as defined hereinabove.

References Cited in the file of this patent

UNITED STATES PATENTS

| | | |
|---|---|---|
| 2,372,244 | Adams et al. | Mar. 27, 1945 |
| 2,579,810 | Fields | Dec. 25, 1951 |
| 2,758,971 | Mikeska | Aug. 14, 1956 |

OTHER REFERENCES

Pudovik et al.: Chemical Abstracts, vol. 47, 1953, p. 10463.

UNITED STATES PATENT OFFICE
CERTIFICATION OF CORRECTION

Patent No. 2,879,235                                         March 24, 1959

Gail H. Birum

It is hereby certified that error appears in the above numbered patent requiring correction and that the said Letters Patent should read as corrected below.

Column 4, line 51, for "An" read -- As --; column 7, line 23, for "1-mercaptononylphosphate" read -- 1-mercaptononylphosphonate --.

Signed and sealed this 6th day of June 1961.

(SEAL)
Attest:

ERNEST W. SWIDER
Attesting Officer

DAVID L. LADD
Commissioner of Patents